(12) United States Patent
Crook et al.

(10) Patent No.: US 6,213,145 B1
(45) Date of Patent: Apr. 10, 2001

(54) BATTERY WATER SUPPLY SYSTEM FOR A BATTERY-POWERED UTILITY VEHICLE

(75) Inventors: Randal L. Crook; Daniel T. Aron, both of Evans; Gerald C. Skelton, Martinez, all of GA (US); Michael A. Vassily, North Augusta, SC (US)

(73) Assignee: Club Car, Inc., Augusta, GA (US)

( * ) Notice: Subject to any disclaimer, the term of this patent is extended or adjusted under 35 U.S.C. 154(b) by 0 days.

(21) Appl. No.: 09/545,939

(22) Filed: Apr. 10, 2000

(51) Int. Cl.[7] .................................................. H01M 2/36
(52) U.S. Cl. ........................... 137/260; 137/899; 429/63; 429/74
(58) Field of Search ................................ 137/260; 429/72, 429/73, 74, 80, 81, 64, 90, 91, 899, 351

(56) References Cited

U.S. PATENT DOCUMENTS

| | | |
|---|---|---|
| 1,791,152 | 2/1931 | Van Meter, Jr. . |
| 3,083,253 | 3/1963 | Sundberg . |
| 3,102,058 | 8/1963 | Jones . |
| 3,664,876 | 5/1972 | Carl . |
| 4,035,554 | 7/1977 | Halberstadt et al. . |
| 4,087,592 | 5/1978 | Okazaki et al. . |
| 4,353,968 | 10/1982 | Boyle . |
| 4,424,263 | 1/1984 | Howell et al. . |
| 4,823,685 | 4/1989 | Boumans et al. . |
| 5,453,334 | * 9/1995 | Melichar .......................... 137/260 X |

* cited by examiner

Primary Examiner—Kevin Lee
(74) Attorney, Agent, or Firm—Michael Best & Friedrich LLP

(57) ABSTRACT

A golf cart, powered by a plurality of electrolytic, lead-acid batteries has an on-board battery water replenishing system. Each battery includes a manifold that feeds water to each battery cell and is capable of transmitting out of the manifold gas generated during recharging. The watering system includes a water storage tank positioned above the batteries, with inlet and outlet tubing connecting each battery manifold to the tank in a separate, parallel circuit. The outlet tubing has a critical size of internal diameter (ID) to assure the formation of gas generated during recharging as bubbles in the outlet tubing so as to trap liquid between bubbles and to cause flow of liquid back to the tank. A one-way flow control valve is positioned in the inlet tubing to assure unidirectional flow. The outlet tubing ID must be less than ⅜ inch, with a preferred size being ¼ inch.

20 Claims, 3 Drawing Sheets

BATTERY WATER SUPPLY SYSTEM FOR A BATTERY-POWERED UTILITY VEHICLE

FIELD OF THE INVENTION

This invention relates to mobile utility vehicles powered by liquid electrolytic batteries, and more particularly to watering systems for replenishing liquid electrolyte in the batteries.

BACKGROUND OF THE INVENTION

Utility vehicles that are battery powered, including golf carts, require periodic recharging and replenishment of liquid electrolyte in the batteries. Conventional liquid filling devices and procedures require connection to a source of water, either pressurized or in a vacuum arrangement, with the water source being located off board of the vehicle. The flow of water through the system is caused by pressurized line water or a vacuum applied to the water circuit. Thus, when the batteries are recharged, a separate water hook up step is required.

There is need for a water supply system that provides on-board water storage, along with sufficient hydraulic pressure, wherein the gassing that occurs during recharging causes water to circulate through the arrangement of batteries.

SUMMARY OF THE INVENTION

This invention provides a mobile utility vehicle powered by a liquid electrolytic battery combination, each battery including a battery manifold for replenishing electrolytic cells in the battery, the manifold also capable of transmitting out of the battery gas generated during recharging comprising: (a) a vehicle frame for carrying a plurality of batteries; and (b) a water supply system for circulating water to the manifold during recharging comprising: (1) a storage tank on the frame for storing water; (2) a hydraulic circuit for connecting each battery to the storage tank in a separate, parallel circuit, each separate circuit comprising: (i) inlet tubing between the storage tank and a battery manifold; (ii) outlet tubing between each battery manifold and the storage tank; and (iii) means for collecting the gas transmitted from the manifold as gas bubbles in the outlet tubing, whereby the bubbles flow to the storage tank as bubbles in the outlet tubing, due to pressure build up in the battery, with water entrapped between the bubbles, causing flow of water through the manifold and the hydraulic circuit during the recharging period; and (3) a one-way flow valve for permitting water flow direction only into the inlet tubing.

DETAILED DESCRIPTION

Figure 1:
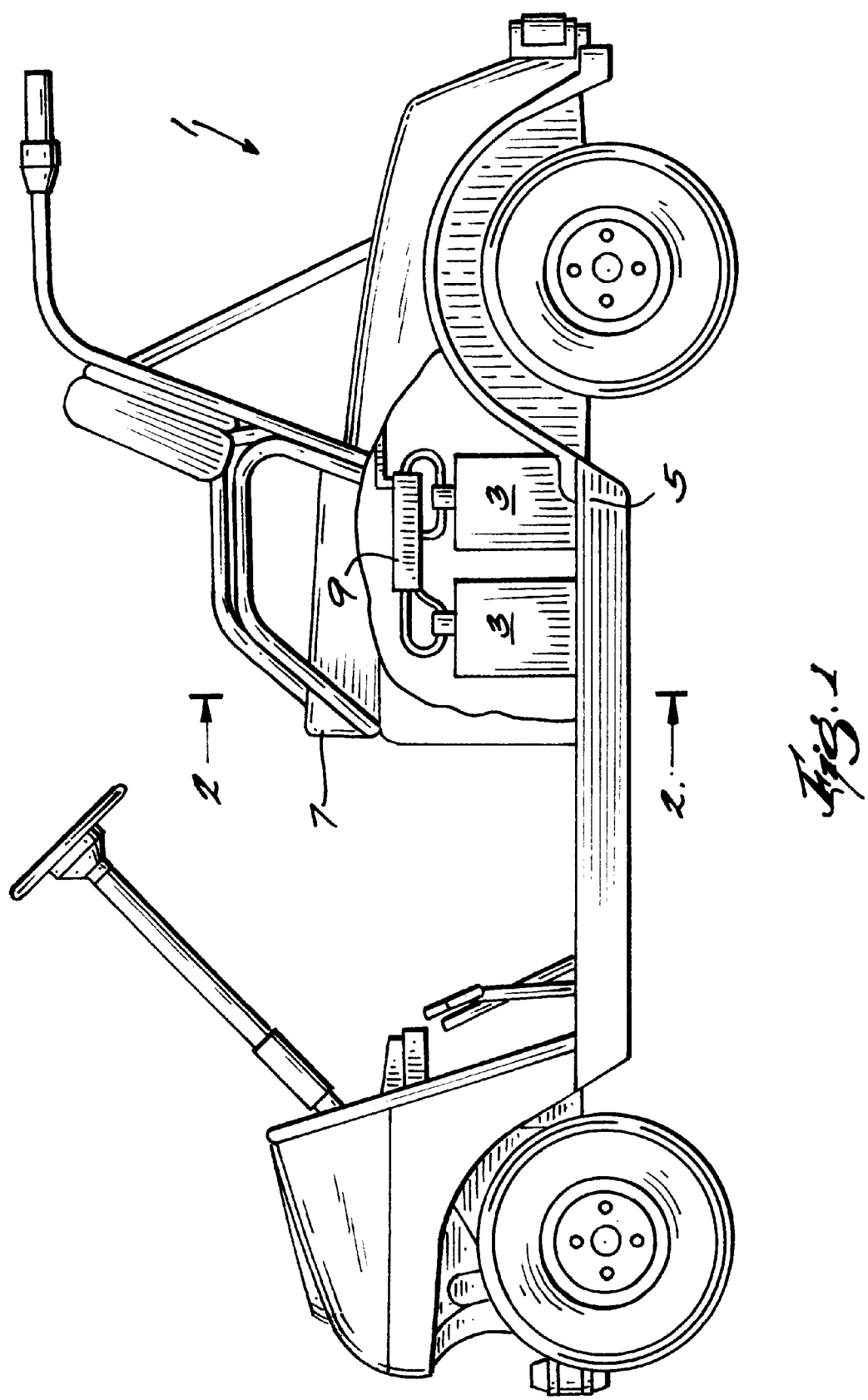
FIG. 1 is a side elevational view, partially in cross section, of a battery-powered golf cart having the invention mounted thereon.
Figure 3:
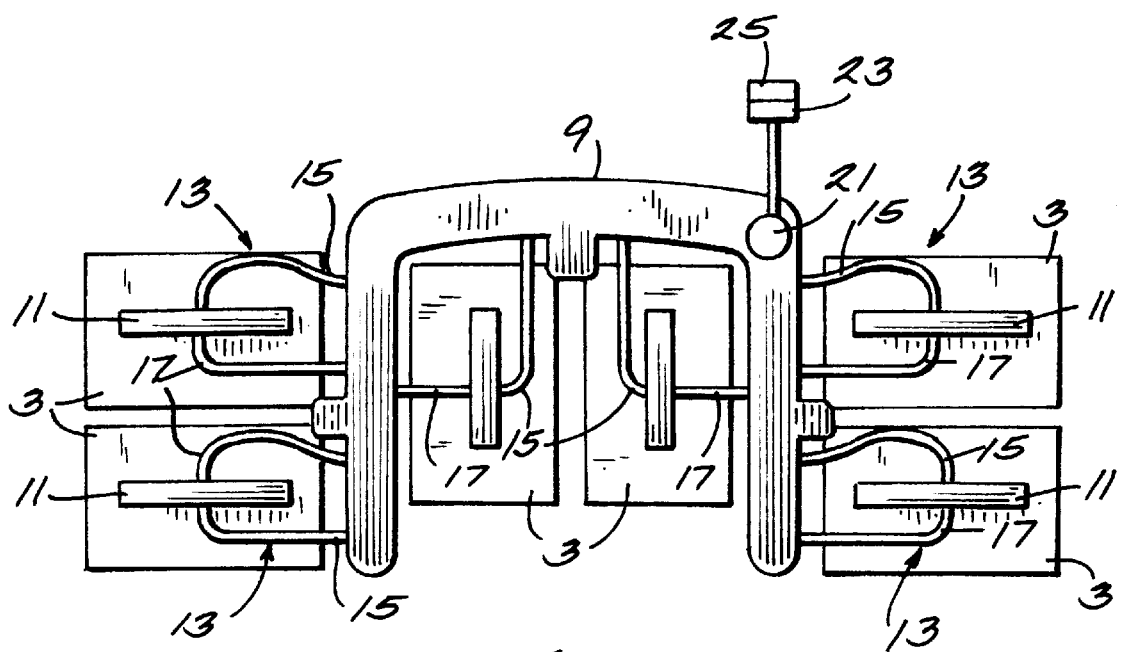
FIG. 3 is a plan view of FIG. 2.
Figure 2:
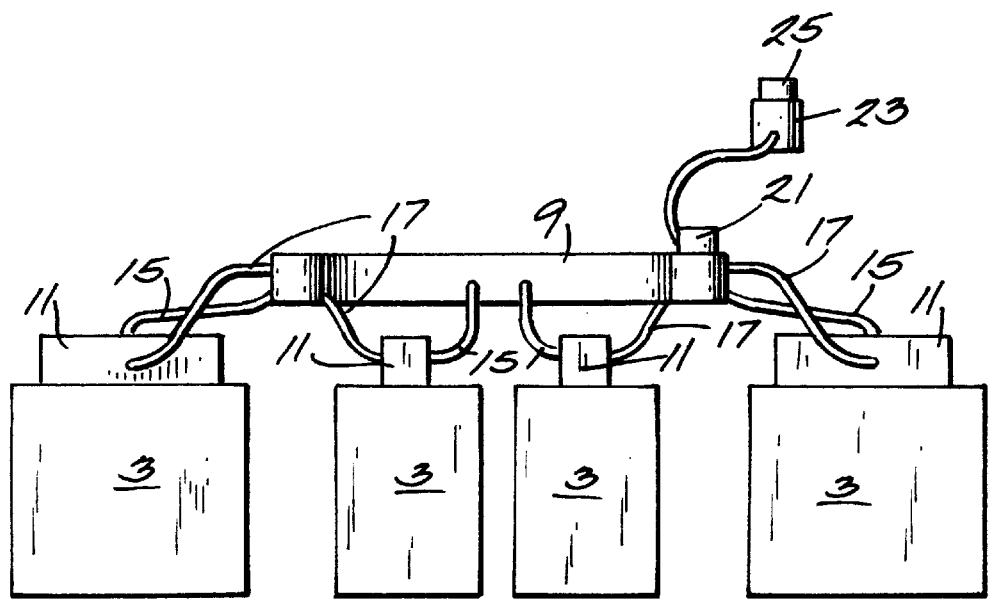
FIG. 2 is a view along 2—2 of FIG. 1, showing the battery arrangement and water feed system of the invention.

FIG. 1 shows a golf cart 1 with a plurality of electrolytic, lead-acid batteries 3 positioned on a frame 5 directly below a passenger seat 7. A water storage tank 9 is also positioned on frame 7 at an elevation above batteries 3, so that a hydraulic pressure head is created due to gravity. As shown in FIGS. 2 and 3, the water supply system of the invention on a golf cart 1 feeds six 8-volt, 4-celled, lead-sulfuric acid batteries 3, although other numbers of batteries and other battery voltages can be accommodated. Each battery 3 includes a manifold 11 for replenishing electrolyte in the battery cells (not shown). Each manifold 11 is capable of replenishing electrolyte in the cells with water from a water source. Water flows into the cells and automatically stops when the electrolyte level reaches a predetermined level in all cells. Manifold 11 is capable of transmitting out of each battery 3 gases (hydrogen and oxygen) generated during recharging of the battery 3. The liquid filling device utilized in the manifold 11 is described in International Patent Application No. WO98/40653, published Sep. 17, 1998, assigned to Trojan Battery Company, and incorporated herein by reference.

We prefer batteries 3 and manifold 11 to be supplied by aforementioned Trojan Battery Company, Santa Fe Springs, Calif. for use with battery product designated as T876.

As shown in FIGS. 2 and 3, each battery 3 is hydraulically connected to tank 9 in a separate, parallel hydraulic circuit 13. Each separate circuit 13 includes inlet tubing means 15 between tank 9 and manifold 11, and outlet tubing means 17 between manifold 11 and tank 9. Tank 9 is periodically filled with water 19 via cap 21. Tank 9 includes a vent 23 to vent battery gas generated during operation and recharging. We prefer vent 23 to include a conventional flame arrester 25 to mitigate any flame from passing back into tank 9, should the gases ignite.

Figure 4:
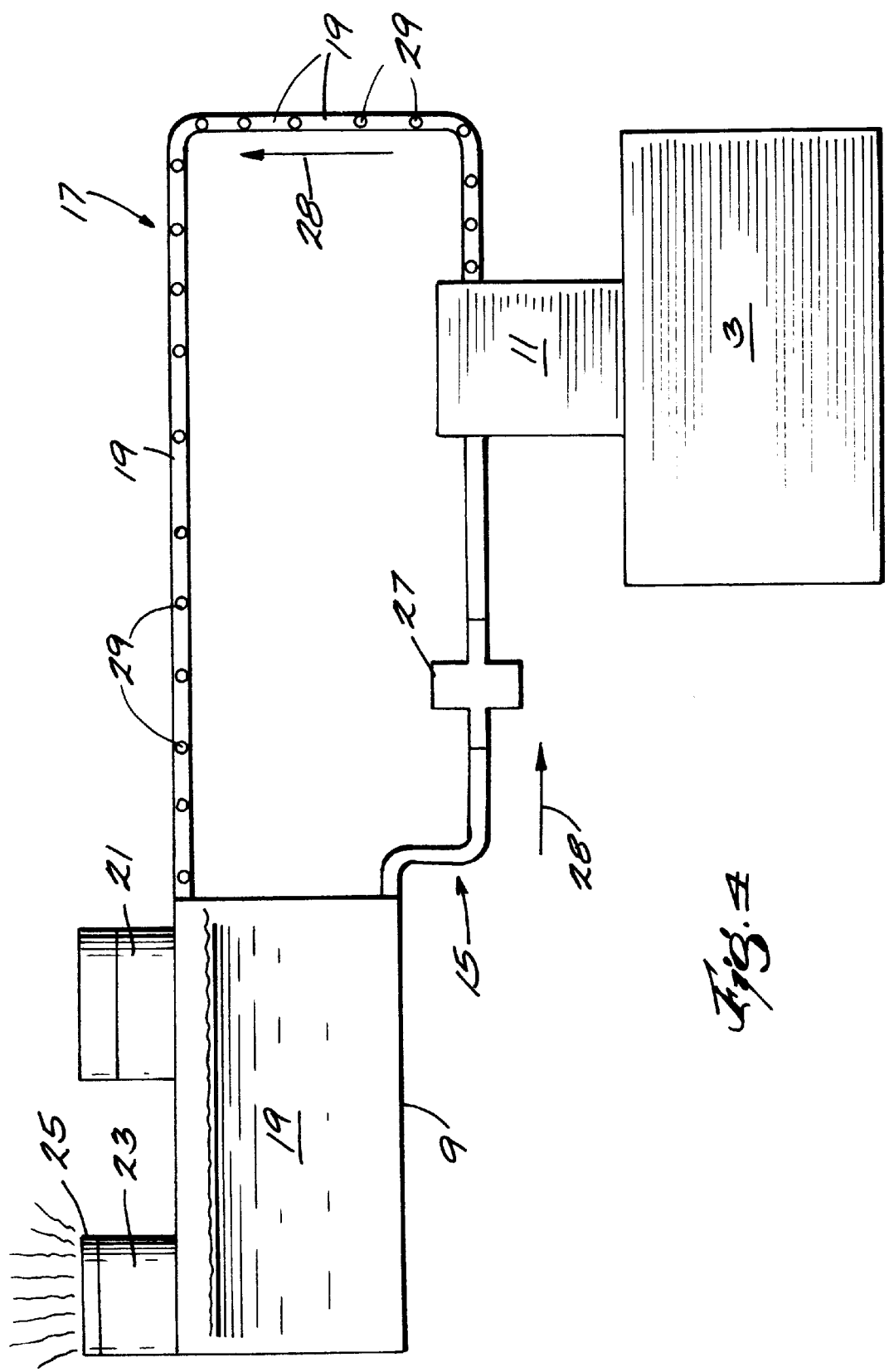
FIG. 4 is a schematic, elevational view of the battery water feed system of the invention.

As shown in FIG. 4, positioned in inlet tubing 15 is a one-way flow valve 27 for permitting water flow only into inlet tubing 15 and battery 3. This assures unidirectional flow of water and gases through the water feed system (arrows 28). We prefer a miniature diaphragm check valve, Part No. A687, from Walworth Sales and Marketing, 100 Wisconsin Ave., Walworth, Wis.

Tank 9 is positioned at a height above batteries 3 so as to provide sufficient hydraulic head pressure to overcome any pressure loss in each circuit across tubing 15, valve 27 battery 3 and tubing 17.

In operation, the water feed system, relying on gravity for head pressure, will reach a point of static equilibrium with the water located in inlet tubing 15, manifold 11, battery 3 and partially up outlet tubing 17. To overcome this equilibrium, and cause the water to flow, battery recharging gas is collected from manifold 11 by outlet tubing 17 as discrete bubbles 29 (FIG. 4), with water 19 trapped therebetween. Bubbles 29 and water 19 flow back to tank 9, with gas being passed out vent 23 and flame arrester 25.

We have discovered that there is a critical size range for outlet tubing required for the invention to trap bubbles 29 against inside walls of tubing 17. If tubing 17 is too large, bubbles 29 do not completely fill tubing 17 and fail to trap water 19 between bubbles 29, failing to circulate water 19. For outlet tubing at or larger than ⅜ inch inside diameter (ID), bubbles do not trap water 19. Below ⅜ inch ID bubbles may begin to trap water and start flow, although at a less than optimum rate. At a tubing size of ¼ inch ID bubbles form at a desirable rate and the flow becomes acceptable. Smaller than ¼ inch ID will work, down to a lower size limit determined by the amount of gas flow through outlet tubing 17 required to safely vent the batteries of charging gas. Thus the range of tubing is less than ⅜ inch (+or −routine size tolerance variation) down to a size required to safely vent battery recharging gas, with a preferred size of ¼ inch ID.

Having described the invention, what is claimed is:

1. In a mobile utility vehicle powered by a plurality of liquid electrolytic batteries, each of said plurality of batteries including a battery manifold for replenishing electrolytic cells in a corresponding one of said plurality of batteries with water, said manifold also being capable of transmitting, out of said corresponding one of said plurality of batteries, gas generated during recharging, the improvement comprising:
   (a) a vehicle frame for carrying said plurality of batteries; and
   (b) a water supply system for circulating water to said manifold during recharging, said water supply system including
      (1) a storage tank on said frame for storing water,
      (2) a hydraulic circuit for connecting each of said plurality of batteries to said storage tank in a separate, parallel circuit, each separate, parallel circuit including
         (i) an inlet tubing between said storage tank and each manifold, and
         (ii) an outlet tubing between each manifold and said storage tank, said outlet tubing being arranged to collect gas transmitted from said manifold in the form of gas bubbles with water entrapped between said bubbles, and whereby said bubbles flow to said storage tank due to pressure build up in said corresponding one of said plurality of batteries causing flow of water through said manifold and said hydraulic circuit during recharging, and
      (3) a one-way flow valve control for permitting water flow in a direction only into said inlet tubing means.

2. The water supply system of claim 1 wherein said storage tank is positioned at an elevation above said plurality of batteries to provide sufficient head pressure by gravity to overcome any pressure loss across said inlet tubing, said plurality of batteries and said outlet tubing.

3. The water supply system of claim 1 wherein said outlet tubing has an internal diameter of less than ⅜ inch.

4. The water supply system of claim 1 wherein said outlet tubing has an internal diameter of about ¼ inch.

5. The water supply system of claim 4 wherein said mobile utility vehicle is a golf cart.

6. In a mobile utility vehicle powered by a battery, said battery including a battery manifold for replenishing electrolytic cells in said battery with water, said manifold also being capable of transmitting, out of said battery, gas generated during recharging, the improvement comprising:
   a vehicle frame for carrying said battery; and
   a water supply system for circulating water to said manifold during recharging, said water supply system including
      a storage tank supported on said frame for storing water, and
      a hydraulic circuit for connecting said battery to said storage tank, said hydraulic circuit including
         an inlet tubing between said storage tank and said manifold, and
         an outlet tubing between said manifold and said storage tank, said outlet tubing being arranged to collect gas transmitted from said manifold in the form of gas bubbles with water entrapped between said bubbles, and whereby said bubbles flow to said storage tank due to pressure build up in said battery causing flow of water through said manifold and said hydraulic circuit during recharging.

7. The water supply system of claim 6 wherein said mobile utility vehicle is powered by at least a first battery and a second battery, said first battery including a first battery manifold for replenishing electrolytic cells in said first battery with water, said first manifold also being capable of transmitting, out of said first battery, gas generated during recharging, said second battery including a second battery manifold for replenishing electrolytic cells in said second battery with water, said second manifold also being capable of transmitting, out of said second battery, gas generated during recharging, and wherein said hydraulic circuit includes
   a first inlet tubing between said storage tank and said first manifold,
   a first outlet tubing between said first manifold and said storage tank, said first outlet tubing being arranged to collect gas transmitted from said first manifold in the form of gas bubbles with water entrapped between said bubbles, and whereby said bubbles flow to said storage tank due to pressure build up in said first battery causing flow of water through said first manifold and said hydraulic circuit during recharging,
   a second inlet tubing between said storage tank and said second manifold, and
   a second outlet tubing between said second manifold and said storage tank, said second outlet tubing being arranged to collect gas transmitted from said second manifold in the form of gas bubbles with water entrapped between said bubbles, and whereby said bubbles flow to said storage tank due to pressure build up in said second battery causing flow of water through said second manifold and said hydraulic circuit during recharging.

8. The water supply system of claim 7 wherein said hydraulic circuit has a first hydraulic circuit portion including said first inlet tubing, said first manifold, and said first outlet tubing and a second hydraulic circuit portion including said first inlet tubing, said first manifold, and said first outlet tubing, said first hydraulic circuit portion and said second hydraulic circuit portion being arranged to provide separate, parallel hydraulic circuit portions.

9. The water supply system of claim 6 wherein said storage tank is positioned at an elevation above said battery to provide sufficient head pressure by gravity to overcome any pressure loss across said inlet tubing, said battery and said outlet tubing.

10. The water supply system of claim 6 wherein said outlet tubing has an internal diameter of less than ⅜ inch.

11. The water supply system of claim 6 wherein said outlet tubing has an internal diameter of about ¼ inch.

12. The water supply system of claim 6 wherein said mobile utility vehicle is a golf cart.

13. The water supply system of claim 6 and wherein the inlet tubing includes a one-way flow control valve for permitting water flow in the inlet tubing in a direction only from said storage tank to said manifold.

14. In a mobile utility vehicle powered by a first liquid electrolytic battery and a second liquid electrolytic battery, said first battery including a first battery manifold for replenishing electrolytic cells in said first battery with water, said first manifold also being capable of transmitting, out of said first battery, gas generated during recharging, said second battery including a second battery manifold for replenishing electrolytic cells in said second battery with water, said second manifold also being capable of transmitting, out of said second battery, gas generated during recharging, the improvement comprising:
   a vehicle frame for carrying said first battery and said second battery; and a water supply system for circulating water during recharging to said first manifold and to said second manifold, said water supply system including
   a storage tank on said frame for storing water, and
   a hydraulic circuit for connecting said first battery and said second battery to said storage tank, said hydraulic circuit including
     a first inlet tubing between said storage tank and said first manifold,
     a first outlet tubing between said first manifold and said storage tank, said first outlet tubing being arranged to collect gas transmitted from said first manifold in the form of gas bubbles with water entrapped between said bubbles, and whereby said bubbles flow to said storage tank due to pressure build up in said first battery causing flow of water through said first manifold and said hydraulic circuit during recharging,
     a second inlet tubing between said storage tank and said second manifold, and
     a second outlet tubing between said second manifold and said storage tank, said second outlet tubing being arranged to collect gas transmitted from said second manifold in the form of gas bubbles with water entrapped between said bubbles, and whereby said bubbles flow to said storage tank due to pressure build up in said second battery causing flow of water through said second manifold and said hydraulic circuit during recharging.

15. The water supply system of claim 14 wherein said hydraulic circuit has a first hydraulic circuit portion including said first inlet tubing, said first manifold, and said first outlet tubing and a second hydraulic circuit portion including said second inlet tubing, said second manifold, and said second outlet tubing, said first hydraulic circuit portion and said second hydraulic circuit portion being arranged to provide separate, parallel hydraulic circuit portions.

16. The water supply system of claim 14 wherein said storage tank is positioned at an elevation above said first battery and said second battery to provide sufficient head pressure by gravity to overcome any pressure loss across said inlet tubing, said first battery, said second battery and said outlet tubing.

17. The water supply system of claim 14 wherein said outlet tubing has an internal diameter of less than 3/8 inch.

18. The water supply system of claim 14 wherein said outlet tubing has an internal diameter of about 1/4 inch.

19. The water supply system of claim 14 wherein said mobile utility vehicle is a golf cart.

20. The water supply system of claim 14 wherein the inlet tubing includes a one-way flow control valve for permitting water flow in the inlet tubing in a direction only from said storage tank.

* * * * *